(12) United States Patent
Neubauer et al.

(10) Patent No.: US 6,378,572 B1
(45) Date of Patent: Apr. 30, 2002

(54) IMAGE PROCESSING SYSTEM FOR INSPECTION OF TABLETS IN SLAB FILLER PACKAGING MACHINES

(75) Inventors: Claus Neubauer, Monmouth; Ming Fang, Princeton Jct., both of NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/819,212

(22) Filed: Mar. 28, 2001

(51) Int. Cl.⁷ .................................................. B65B 1/04
(52) U.S. Cl. .............................. 141/94; 221/2; 221/155; 53/54; 53/493
(58) Field of Search ............................. 141/2, 18, 1, 94, 141/83, 192; 221/155, 2–8, 17, 92; 53/52, 54, 493, 494, 495, 498, 499, 500

(56) References Cited

U.S. PATENT DOCUMENTS

| | | | | |
|---|---|---|---|---|
| 5,427,161 A | * | 6/1995 | Luhmann et al. | 141/1 |
| 5,502,944 A | * | 4/1996 | Kraft et al. | 221/2 |
| 6,345,487 B1 | * | 2/2002 | Luciano et al. | 53/147 |

* cited by examiner

Primary Examiner—Steven O. Douglas
(74) Attorney, Agent, or Firm—Donald B. Paschburg

(57) ABSTRACT

A method for monitoring a slab filler, including grabbing a dispensing frame from a dispensing side of the slab filler, and grabbing a discharge frame from a discharge side of the slab filler. The method further includes classifying a plurality of cavities in the slab filler according to a correlation between the dispensing frame and at least one template, and classifying the plurality of cavities in the slab filler according to a correlation between the discharge frame and the template.

19 Claims, 2 Drawing Sheets

IMAGE PROCESSING SYSTEM FOR INSPECTION OF TABLETS IN SLAB FILLER PACKAGING MACHINES

BACKGROUND OF THE INVENTION

1. Field of the Invention

The present invention relates to video monitoring, and more particularly towards a system and method for monitoring slab filler machines.

2. Discussion of the Prior Art

A typical slab filler machine includes a number of slabs arranged in rows forming a belt. Each slab includes a number of cavities for accepting a pre-determined number of tablets per cycle. The number of cavities per row defines the number of tablets simultaneously dispensed. These tablets, such as medication or vitamins, are dispensed into a container, automating the process of filling containers with the pre-determined number of tablets. However, slab filler machines lack methods for ensuring the desired number of tablets are dispensed into each container. For example, the slab filler machine cannot account for random events, such as a broken or missing tablets, thus a given container may include less than the desired (pre-determined) number of tablets.

Current methods of quality control are not robust or accurate. Further, some systems may require modification of the slab filler machines. These modifications are generally not well received by manufacturers. Further, modifications may not work with all tablets. For example, for a method where tablets are backlit and the presence of light indicates a missing tablet, holes are drilled through each cavity of a slab. However, the accuracy of the system may be affected when used with translucent tablets, and the robustness of the method may be affected when used with tablets which may fall through the holes.

Currently, no quality control method exists for monitoring slab fillers in conjunction with the variety of tablets on the market. Therefore, a need exists for a robust and accurate system and method of monitoring slab filler machines.

SUMMARY OF THE INVENTION

The present invention relates to a method for monitoring a slab filler machine. The method includes grabbing a dispensing frame from a dispensing side of the slab filler, and classifying a plurality of cavities in the slab filler according to a correlation between the dispensing frame and at least one template.

The method localizes the cavities in the dispensing frame prior to classifying the cavities. The method normalizes the dispensing frame prior to classifying the cavities.

A plurality of slabs can be monitored simultaneously.

The method further comprises the step of initializing a layout of the slab filler. Initialization the layout includes determining a number of columns including cavities on the slab filler, and determining a number of rows including cavities on the slab filler. Initialization also includes determining a difference between the dispensing frame and a discharge frame grabbed from a discharge side of the slab filler, a significant different indicating an active cavity, a non-significant different indicating a plugged cavity. The position of each cavity in each frame is determined based on a projection in the x-axis of the slab filler and a projection in the y-axis of the slab filler.

According to an embodiment of the present invention, an apparatus is provided for monitoring a slab filler machine including a plurality of cavities. The apparatus includes a first camera with a view of a dispensing side of the slab filler, a second camera with a view of a discharge side of the slab filler, and a compare module receiving a frame from each camera, the compare module which localizes the cavities in each frame and compares each cavity to at least one template.

According to an embodiment of the present invention, a method is provided for monitoring a slab filler machine. The method includes grabbing a dispensing frame from a dispensing side of the slab filler, and grabbing a discharge-frame from a discharge side of the slab filler. The method further includes classifying a plurality of cavities in the slab filler according to a correlation between the dispensing frame and at least one template, and classifying the plurality of cavities in the slab filler according to a correlation between the discharge frame and the template.

The method localizes the cavities in each frame prior to classifying the cavities. The method normalizes each frame prior to classifying the cavities.

A plurality of slabs can be monitored simultaneously.

The method includes initializing a layout of the slab filler. Initialization comprises determining a number of columns including cavities on the slab filler, determining a number of rows including cavities on the slab filler, and determining a difference between the dispensing frame and the discharge frame, a significant different indicating an active cavity, a non-significant different indicating a plugged cavity. The position of each cavity in each frame is determined based on a projection in the x-axis of the slab filler and a projection in the y-axis of the slab filler.

The method applies a search window to each cavity prior to classifying, wherein the search window is at least the size of the template, and determines a correlation coefficient for at least one template position within the search window. The method further includes determining a correlation coefficient between the template position and a full template, and determining a correlation coefficient between the template position and an empty template. The method determines a highest correlation coefficient between determined correlation coefficients, and assigns a class corresponding to the highest correlation coefficient to the cavity in the search window. The method includes comparing the highest correlation coefficient to a pre-defined threshold to determine a tablet state within each cavity. The tablet state is one of present, missing, and broken.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a method for monitoring slab filler machines is provided. Preferably, two cameras determine the presence of tablets in the slab filler before and after filling containers. An image-processing method evaluates whether each cavity in the slab is occupied by a tablet. In addition, the integrity of the tablets can be determined, specifically whether the tablet is broken or the color patter is acceptable.

A first camera determines whether each cavity is occupied by a tablet before the tablets are filled into the container, and a second camera determines, if each cavity is empty after filling. Thus, the present invention can determine, in real time, the number of tablets filled into each container, ensuring that the container includes the desired number of tablets.

Figure 1:
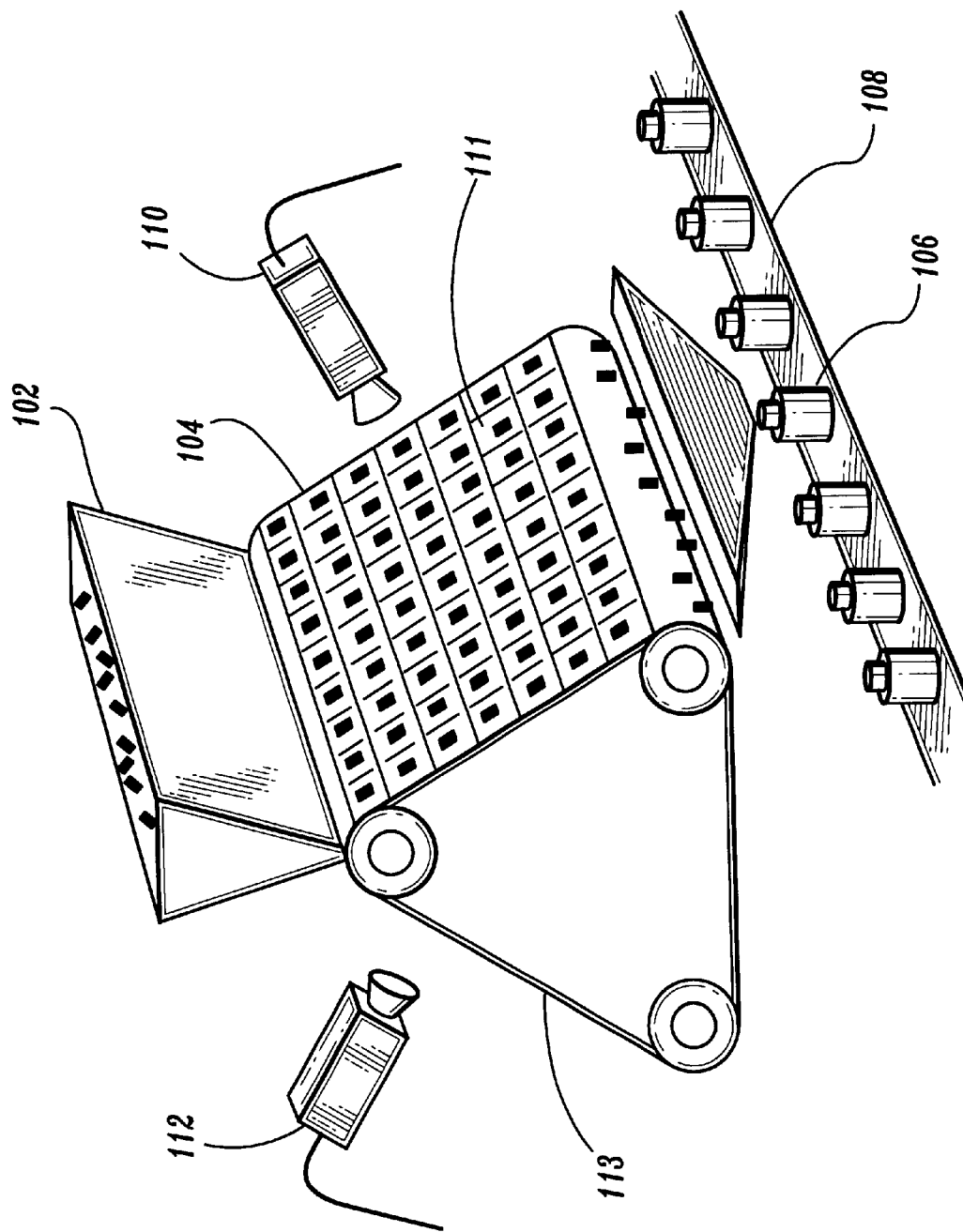
FIG. 1 is an illustrative diagram of a slab filer machine according to an embodiment of the present invention.

Referring to FIG. 1, tablets are supplied to a slab via a funnel 102 above the slab machine 104. The tablets fall from the funnel 102 into the cavities of a slab as the slab filler rotates, filling each cavity with a tablet. Tablets fall out of cavities, assisted by gravity or other means, and into a container 106 or group of containers. Containers may be provided via a conveyor belt 108.

For tablet inspection, a first camera 110 is mounted with a view of a dispensing side of the slab machine 111 to determine the completeness and the integrity of the tablets. A second camera 112 is mounted with a view of a discharged side of the slab machine 113 to determine whether all cavities are empty, ensuring that the desired number of tablets have been dispensed into the container. The number of tablets per slab may depend on the size of the tablet. For smaller tablets, additional cavities may be fitted to a row.

Figure 2:
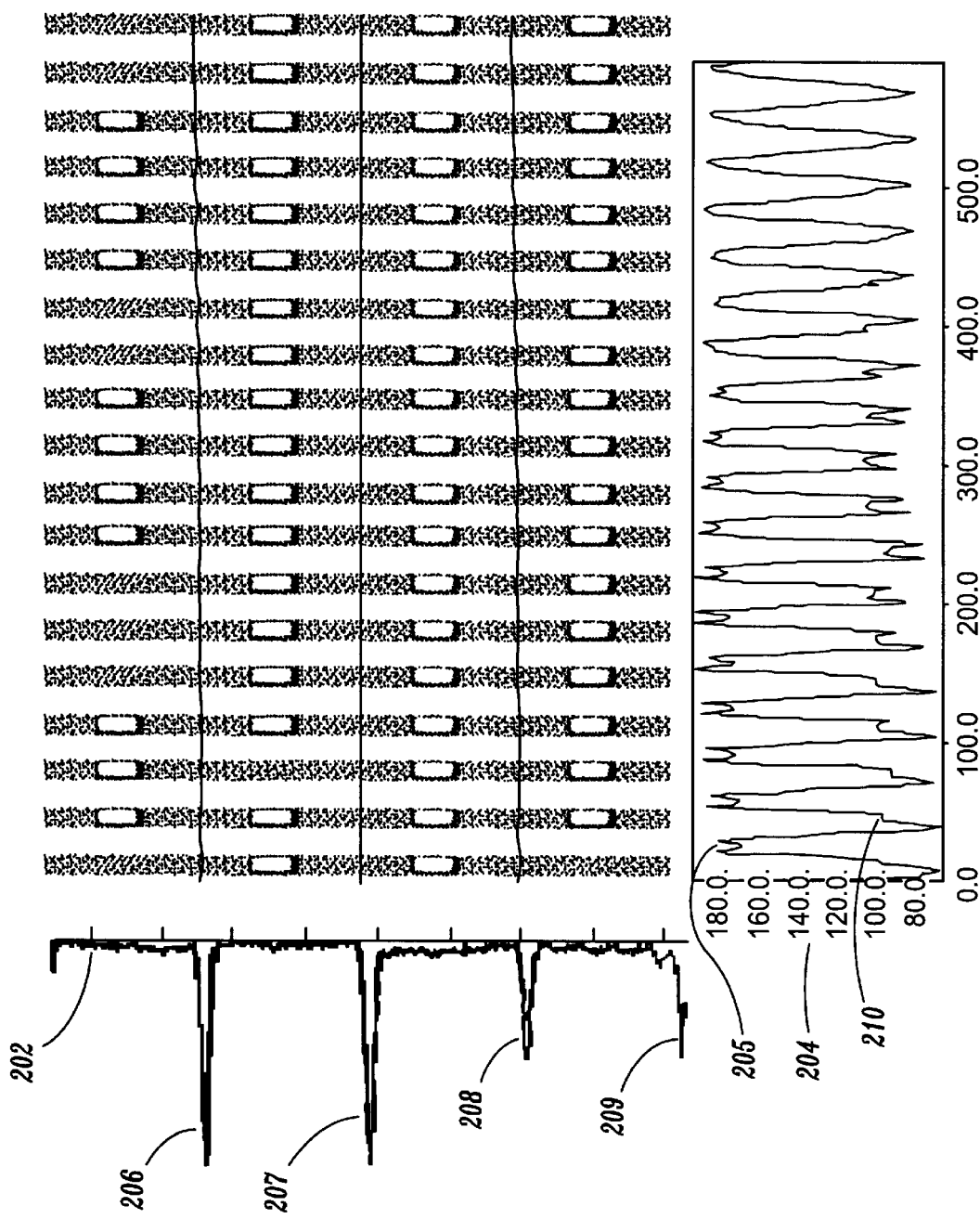
FIG. 2 is a view of a slab filler machine and two graphs corresponding to tablet positions according to an embodiment of the present invention.

Each camera may inspect several slabs simultaneously, for example, as shown in FIG. 2, four slabs are included in a frame. A frame grabber receives a trigger signal from the motor control of the slab filler so that image acquisition is synchronized with the movement of the slab.

During processing, most cavities are filled with a tablet. However, in some instances, a cavity may be empty or a position may not have a cavity. By removing one or more cavities from a slab, the number of tablets dispensed may be varied to accommodate a container including m tablets, where the number of tablets per slab is not a multiple of m.

According to an embodiment of the present invention, a training method is used for initializing to the layout of the slab machine for a particular tablet or container. During training images are captured using all cameras for at least one cycle or complete revolution of the slab machine. The image processing system automatically determines the layout of the slabs for a given tablet by comparing the images from the first camera 110 and the second camera 112. The system determines the number of columns and the number of rows or slabs on the slab filler belt.

For each cavity, an image from the first camera 110 is compared to an image from the second camera 112. If the images are similar to each other for a cavity, the position is determined not to be used. Therefore, the cavity is not to be inspected for the particular tablet and package size. If there is a significant difference between the images, then the tablet corresponding to that position is determined to have been dispensed into a container. The images are then added to a training database.

After the collection of training images is finished, a template a created for two classes, "full" and "empty." The templates are images representing an object for the purpose of a comparison. In the case of tablet inspection, the template is approximately the size of the cavity holding the tablet. During training several sub-images are collected from empty cavities ("empty" class) and from cavities filled with a tablet ("full" class). Sub-images containing empty cavities are added pixel by pixel so that an averaged image is generated, where small variations within the images are smeared out. The average image is used as template. A second template is generated based on cavities filled with a tablet. A normalized correlation coefficient is determined to compare the incoming image with the templates. Both the template and the image are normalized with respect to brightness and contrast to compensate for illumination changes.

The template image may be determined using the equation:

$$T(i) = (T(i) - \mu)/\sigma$$

where T is the template image; $\mu, \sigma$ denote average brightness, contrast.

The incoming image may be determined used the equation:

$$I(i) = (I(i) - \mu)/\sigma$$

where I is the incoming image; $\mu, \sigma$ denote average brightness, contrast.

The normalized correlation coefficient may be written:

$$c = \Sigma I(i) \times T(i)$$

where c denotes the normalized correlation coefficient, I denotes the incoming image and T denotes the template image. The normalized correlation coefficient c is $\epsilon [-1,1]$ (where 1 indicates perfect correlation and −1 indicates anti-correlation). During online classification (e.g., the production or testing mode) the normalized correlation coefficients between an incoming image and both templates (class "full" and class "empty") are determined and the class with the highest correlation coefficient is assigned to the image.

If the cameras are close to the slabs, distortion variations at different viewing angles may become significant throughout the field of view. It may be possible to divide the slab into several regions and train the system for each region.

Processing the images captured by the cameras includes frame grabbing, localization of tablets, and classification tablets. Localization may be needed even though the frame grabber is synchronized with the conveyor belt due to, for example, mechanical tolerances in the slab filler. The tolerances may cause variations in positions tablets and/or cavities between frames.

The position of the cavities in each frame is determined using projections in x and y-axes of the slab filler as illustrated in FIG. 2. An image is projected along the x-axis of the slab filler resulting in a first signal 202. The projection is obtained by calculating the sum of the gray values of each pixel in a row divided by the number of pixels in a row. The positions of cavities along the x-axis (rows) of the slab filler are determined based on spikes in the signal 206–209. The image is also projected along the y-axis of the slab filler resulting in a second signal. The positions of cavities along the y-axis of the slab filler may be distinguished according to the signal spikes. Cavities containing tablets are excluded from the projection by an edge filter. The edge filter distinguishes between a spike cause by a column 205 and a spike caused by a tablet 210. Combining the information from the projections (202 and 204) reveals a grid of possible tablet positions.

The localized cavity positions are extracted from the frames. Before classification of tablets within the cavities, the cavities are sub-sampled. The resolution of the region containing a cavity may be reduced through sub-sampling to reduce the processing time. Sub-sampling is achieved by replacing pixel blocks (n×n pixels) with the block's average gray value. The gray values for each pixel in a block are added and divided by the number of pixels n×n. n should be small enough so that image details for classification are still present in the low resolution image. It should be noted that different blocks, for example, rectangles, may be used without departing from the scope or spirit of the present invention.

Further, since changes in illumination may occur during the tablet processing, a normalization method may be applied to the frames. Thus, variations in brightness and contrast may be compensated for. Normalization techniques for use with digital images are well known in the art.

Both the training template and the images to be classified are normalized in the same way and are compared by correlation. During classification a grid of tablet positions is evaluated. Around each ideal tablet position a search window of width (x pixel) and height (y pixel) is defined. The purpose of the search window is to allow for position variations of the tablet. x and y are greater than or equal to the template width and height, respectively, which has been determined during training. The template is moved within the search window, thus, an array of correlation coefficients is generated. A normalized correlation coefficient is computed for "full" and "empty" class. The maximum correlation coefficient in the array is determined within the search window and the associated classification is assigned to the particular position. In addition, the method may distinguish whole tablets from broken or damaged tablets, since damaged tablets will result in a substantially lower correlation coefficient than whole tablets.

The final decision, whether the tablet is damaged, is based on a threshold applied to the correlation coefficient. The threshold may be adjusted to balance a false alarm rate (good tablet classified as damaged tablet) and an error rate (damaged tablet classified as good). The threshold can be adjusted either manually or automatically. For automated threshold determination, distributions of both damaged tablets and integer tablets may be based on damaged tablets and integer tablets respectively. These tablets may be introduced during a training session.

Instead of using the correlation coefficient as a feature to distinguish between "full" and "empty" cavity other classification features may be extracted from the image region containing the tablet. For example, color cameras may be used, the color information may be used to distinguish between "full" and "empty" class. In this case the red/green/blue component of the color image is transformed to into the hue/saturation/intensity space and the hue is used as the feature for classification.

Further, a set of features may be combined into one feature vector. The feature vector may be classified with a statistical classifier like Nearest Neighbor Classifier, Minimum Distance Classifier or Neural Network Classifier.

According to an embodiment of the present invention, a system and method for real-time inspection of tablets is provided. The method determines the completeness and integrity of tablets. The automated system includes a processor and at least two cameras. Further, the method can be learned by a machine, thus, the method may eliminate user input for at least training purposes.

Having described embodiments of a system and method for image processing for inspection of tablets in a slab filler packaging machine, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for monitoring a slab filler comprising the steps of:
    grabbing a dispensing frame from a dispensing side of the slab filler; and
    classifying a plurality of cavities in the slab filler according to a correlation between the dispensing frame and at least one template.

2. The method of claim 1, further comprising the step of localizing the cavities in the dispensing frame prior to classifying the cavities.

3. The method of claim 1, further comprising the step of normalizing the dispensing frame prior to classifying the cavities.

4. The method of claim 1, wherein a plurality of slabs are monitored simultaneously.

5. The method of claim 1, further comprising the step of initializing a layout of the slab filler.

6. The method of claim 5, wherein the initialization comprises the steps of:
    determining a number of columns including cavities on the slab filler;
    determining a number of rows including cavities on the slab filler; and
    determining a difference between the dispensing frame and a discharge frame grabbed from a discharge side of the slab filler, a significant different indicating an active cavity, a non-significant different indicating a plugged cavity.

7. The method of claim 5, wherein the position of each cavity in each frame is determined based on a projection in the x-axis of the slab filler and a projection in the y-axis of the slab filler.

8. An apparatus for monitoring a slab filler including a plurality of cavities comprising:
    a first camera with a view of a dispensing side of the slab filler;
    a second camera with a view of a discharge side of the slab filler; and
    a compare module receiving a frame from each camera, the compare module which localizes the cavities in each frame and compares each cavity each frame to at least one template.

9. A method for monitoring a slab filler comprising the steps of:
    grabbing a dispensing frame from a dispensing side of the slab filler;
    grabbing a discharge frame from a discharge side of the slab filler;
    classifying a plurality of cavities in the slab filler according to a correlation between the dispensing frame and at least one template; and
    classifying the plurality of cavities in the slab filler according to a correlation between the discharge frame and the template.

10. The method of claim 9, further comprising the step of localizing the cavities in each frame prior to classifying the cavities.

11. The method of claim 9, further comprising the step of normalizing each frame prior to classifying the cavities.

12. The method of claim 9, wherein a plurality of slabs are monitored simultaneously.

13. The method of claim 9, further comprising the step of initializing a layout of the slab filler.

14. The method of claim 13, wherein the initialization comprises the steps of:

determining a number of columns including cavities on the slab filler;

determining a number of rows including cavities on the slab filler; and determining a difference between the dispensing frame and a discharge frame grabbed from a discharge side of the slab filler, a significant different indicating an active cavity, a non-significant different indicating a plugged cavity.

15. The method of claim 13, wherein the position of each cavity in each frame is determined based on a projection in the x-axis of the slab filler and a projection in the y-axis of the slab filler.

16. The method of claim 9, further comprising the steps of:

applying a search window to each cavity prior to classifying, wherein the search window is at least the size of the template; and determining a correlation coefficient for at least one template position within the search window.

17. The method of claim 16, further comprising the steps of:

determining a correlation coefficient between the template position and a full template;

determining a correlation coefficient between the template position and an empty template;

determining a highest correlation coefficient between determined correlation coefficients; and assigning a class corresponding to the highest correlation coefficient to the cavity in the search window.

18. The method of claim 17, further comprising the step of comparing the highest correlation coefficient to a predefined threshold to determine a tablet state within each cavity.

19. The method of claim 18, wherein the tablet state is one of present, missing, and broken.

\* \* \* \* \*